(12) United States Patent
Sawaguchi et al.

(10) Patent No.: US 7,024,617 B2
(45) Date of Patent: Apr. 4, 2006

(54) DATA DECODING METHOD AND CIRCUIT AND INFORMATION RECORDING AND REPRODUCING APPARATUS USING THE SAME

(75) Inventors: Hideki Sawaguchi, Kokubunji (JP); Yasutaka Nishida, Kodaira (JP); Masafumi Mochizuki, Kokubunji (JP); Hiroyuki Tsuchinaga, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 406 days.

(21) Appl. No.: 10/206,211

(22) Filed: Jul. 29, 2002

(65) Prior Publication Data

US 2003/0151838 A1  Aug. 14, 2003

(30) Foreign Application Priority Data

Feb. 8, 2002 (JP) .............................. 2002-031860

(51) Int. Cl.
*H03M 13/03* (2006.01)
(52) U.S. Cl. ....................................... 714/794; 714/795
(58) Field of Classification Search ................ 714/794, 714/795, 796; 375/262, 341
See application file for complete search history.

(56) References Cited

U.S. PATENT DOCUMENTS 4,498,175 A * 2/1985 Nagumo et al. ............ 714/756
6,009,552 A * 12/1999 Ariel et al. ................. 714/780
6,023,783 A * 2/2000 Divsalar et al. ............ 714/792
6,032,283 A * 2/2000 Meyer ........................ 714/746
6,097,320 A * 8/2000 Kuki et al. .................. 341/58
6,373,407 B1 * 4/2002 Nishiya et al. .............. 341/59
2003/0152175 A1 * 8/2003 Kuki et al. ................. 375/350

OTHER PUBLICATIONS

R.D. Cideciyan et al, "A PRML System for Digital Magnetic Recording", IEEE Jounral on Selected Areas in Communications, vol. 10, No. 1, Jan. 1992, pp. 38-56.

* cited by examiner

*Primary Examiner*—Joseph D. Torres
(74) *Attorney, Agent, or Firm*—Mattingly, Stanger, Malur & Brundidge, P.C.

(57) ABSTRACT

In a partial-response maximum-likelihood (PRML) signal detection and processing technique, reduction of data detection error events caused due to medium noise is achieved. For a PRML detection data result obtained after PRML data demodulation, a code error event that depends on a signal distance, and which has a high frequency of occurrences, is noticed and its occurrence probability is estimated. A locally-existing medium noise quantity is estimated from preceding and subsequent code patterns of the PRML detection data result. Based on this, the occurrence probability of the error event is compensated to improve the detection precision. As a result, data modulation with reliability higher than conventional maximum likelihood detection can be realized with a simple circuit structure.

7 Claims, 6 Drawing Sheets

RELIABILITY DECISION IN CONVENTIONAL
MAXIMUM LIKELIHOOD DETECTION

FIG.3B

RELIABILITY DECISION IN PRESENT INVENTION

FIG.4

DATA DECODING METHOD AND CIRCUIT AND INFORMATION RECORDING AND REPRODUCING APPARATUS USING THE SAME

BACKGROUND OF THE INVENTION

The present invention relates to a data decoding and reproducing method for high density information storage, and a data decoding and reproducing circuit and an information storing and reproducing apparatus for implementing such a method.

In implementing high density information storage, it is demanded to demodulate recorded information data from a signal reproduced from a recording medium, with high reliability. In high density magnetic recording and reproducing apparatuses represented by magnetic disk drive apparatuses, data demodulation with high reliability becomes difficult. Because an increase of intersymbol interference and a remarkable degradation in signal quality, i.e., signal-to-noise ratio is caused in the reproduced signal as the recording density is increased.

In order to overcome such a technical problem, the partial-response maximum-likelihood detection (PRML) technique obtained by combining the partial-response equalization technique with the maximum likelihood detection technique is widely used. In particular, in magnetic recording, a combination of the partial response class 4 (PR4) or its extended equalization technique with maximum likelihood data detection implemented by the Viterbi algorithm or the like has been applied as a signal processing technique that is more suitable for high density data recording and reproduction. On the other hand, in optical recording and reproducing apparatuses or the like, a combination of the partial response class 1 or its extended equalization technique with maximum likelihood data detection has been proposed as a suitable data signal processing technique.

Such a PRML technique is widely known as a data detection/demodulation technique that provides means for effectively utilizing signal power of the reproduced signal sequence and decoding the most-likely data sequence from the noisy reproduced signal sequence. The PRML technique is implemented as extremely small-sized, highly integrated circuits with the advance of the semiconductor technologies. Such integrated circuits are mounted on a lot of information recording and reproducing apparatuses, thus bringing about effects that are effective in achieving high density recording. The principle of such a PRML data demodulation technique is to improve the reliability of data modulation against noise on a reproduced signal by effectively utilizing intersymbol interference (ISI) the reproduced signal waveform has.

In the conventional PRML data detection/demodulation technique, it is supposed that noise component contained in a reproduced signal at the detection point can be regarded as stationary white noise. In other words, it is supposed that the noise variation components contained in the reproduced signal behave as stochastic random variations that are completely independent of each other. In addition, suppose that the noise component at any point of the reproduced signal follows the same statistical property, it is ensured that the ML (maximum-likelihood) decoder can decode the most-likely data sequence. In the signals reproduced from an actual high density information storage apparatus, however, it is extremely difficult to maintain these suppositions for the noise variation component. In particular, in reproduced signals in high density magnetic storage apparatuses, existence of a medium noise caused by disorder of magnetization bit cell written onto the medium becomes remarkable. In this case, the noise components exist locally depending on the recorded magnetization state on the recording medium. Therefore, distribution of the media noise on the reproduced signal changes greatly depending on the recorded magnetization pattern (data sequence pattern), and it can be regarded as so-called nonstationary noise variations with strong data dependency and correlation. As the premise for the noise components greatly collapses, the reliability of data detection in the PRML data demodulation technique gradually degrades.

SUMMARY OF THE INVENTION

An object of the present invention is to provide a simpler method in order to compensate the reliability degradation of data detection in the PRML data detection/demodulation technique due to the nonstationary noise variation component that changes depending on the (recorded) data pattern, such as the medium noise in high-density recording apparatus.

In the PRML data detection/demodulation technique as described above, most of error events in the maximum likelihood data detection (ML detection) tend to have some specified error patterns. That is caused due to the fact that the maximum likelihood data detection (ML detection) is performed by selecting a code sequence that forms a signal sequence having the least sum of errors with respect to the whole series of given reproduced signal sequence. In addition, that is caused because the discrimination margin of the signal sequence with respect to noise variation depends on sum of the squared errors between the reproduced signal sequence the correct data code sequence has and the reproduced signal sequence the error data code sequence has. In other words, it can be said that the error event that frequently occurs in the maximum likelihood data detection has an error pattern that decreases the sum of the squared errors between the reproduced signal sequences for the correct data sequence and for the error data sequence.

In accordance with one aspect of the present invention, there is provided means to decide again whether a specific code error pattern has occurred on each code position of a data sequence decoded once by the maximum likelihood data detection (ML detection) in order to achieve the simpler error correction. Then, the specific error pattern in the maximum likelihood data detection can be identified beforehand on the basis of a distance structure of the reproduced signal sequence which is characterized by the sum of the errors between the reproduced signals corresponding to the decoded sequence and the error data sequence.

First, in this decision, the stochastic likelihood (event probability) of occurrence of the identified code error pattern at each data position is calculated by using again the reproduced signal sequence input for the maximum likelihood data detection (ML detection). In addition, correction of the stochastic likelihood (event probability) considering the effect of the above described stochastic property and distribution of the media noise is performed by referring to code data patterns in positions before and after each decision on the decoded data sequence decoded by the maximum likelihood data detection (ML detection). This aims at improving the precision of the stochastic likelihood (event probability) of the identified code error event occurrence preventing the influence of the data-dependent noise component such as media noise dominant in high density recording apparatus.

Thus, the data demodulation technique disclosed by the present invention provides means for efficiently and simply compensating for occurrence of detection errors caused by a data-dependent noise statistic property and distribution by focusing on just a few specific code error events that pose a problem in the maximum likelihood data detection. According to this technique, more reliable data demodulation for the conventional PRML data demodulation technique can be realized.

Other objects, features and advantages of the invention will become apparent from the following description of the embodiments of the invention taken in conjunction with the accompanying drawings.

DETAILED DESCRIPTION OF THE EMBODIMENTS

Embodiments of the present invention will now be described with reference to the accompanying drawings.

Figure 1:
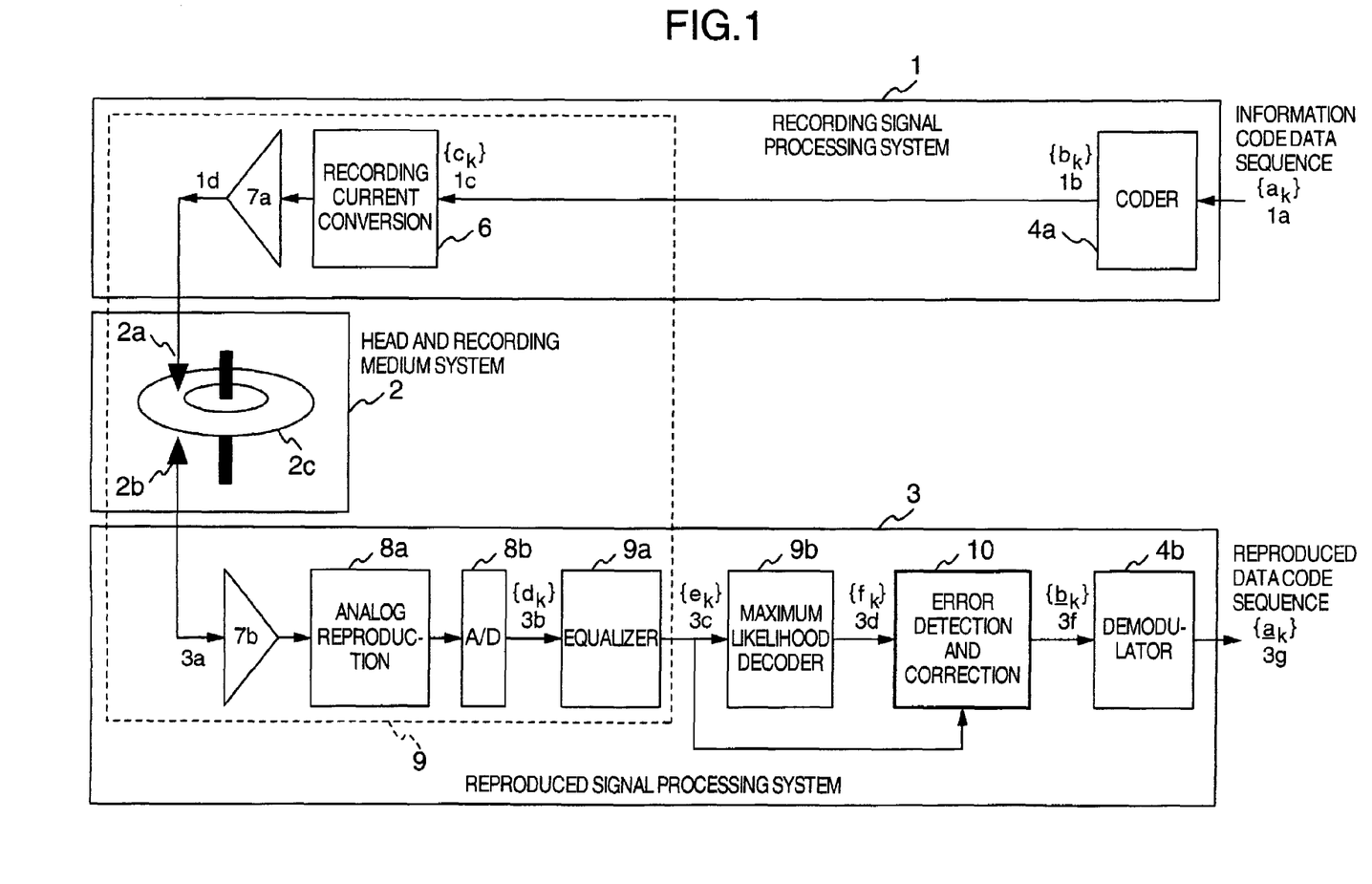
FIG. 1 is a circuit block diagram showing a schematic configuration of a recording and reproducing system for implementing the present invention.

FIG. 1 shows a basic configuration of an information recording and reproducing system to which the present invention is applied. As shown in FIG. 1, the information recording and reproducing system of the present embodiment includes a recording signal processing system 1, a head and recording medium system 2, and a reproduced signal processing system 3. The invention contemplates improving the reliability of recorded information reproduction in a signal processing system, especially in the reproduced signal processing system 3. This data recording and reproducing method can be applied to the head and recording medium system 2 based upon various recording and reproducing principles such as magnetic, optical or magneto-optical recording. Supposing especially a magnetic recording and reproducing system represented by a magnetic disk apparatus, the embodiment will now be described.

In the recording signal processing system 1 of the present embodiment, an information code data sequence $\{a_k\}$ 1a (where k is an integer that indicates bit time) that represents original information to be recorded is subjected to predetermined code conversion processing in a coder 4a, and is output as a modulated code data sequence $\{b_k\}$ 1b. The code conversion processing (addition of a redundant code) in the coder 4a includes (1) error correction coding for detecting and correcting data errors occurring at the time of information reproducing, and (2) modulation coding for adding a specific code constraint condition to a recording data code sequence for various purposes such as assurance of amplitude and timing control information to be extracted from a reproduced signal, suppression of a DC component on a recorded and reproduced signal, or elimination of recording code patterns that easily cause reproducing errors. The concrete means for coding are selected according to characteristics of the target information recording and reproducing system and desired performance. For example, the error correction coding (1) is represented by Reed-Solomon error correction coding, and the recording modulation coding (2) is represented by existing techniques such as run length limiting coding and DC free coding. And the modulated code data sequence $\{b_k\}$ 1b is supplied to a partial response transmission system 9 (recording and reproducing transmission system) as a recording code data sequence $\{c_k\}$ 1c, converted to an analog recording current signal 1d via a recording current conversion processing circuit 6 and a recording amplifier 7a, and then supplied to the head and recording medium system 2 to store the information.

The head and recording medium system 2 is an electromagnetic conversion system. In the head and recording medium system 2, a recording magnetic field induced from a recording head 2a by the recording current signal id records magnetization information successively on a recording medium 2c. The recording medium 2c moves relatively to the recording head 2a. According to two senses of the recording current signal (i.e., recording magnetic field) corresponding to signs of the recording code data sequence $\{c_k\}$ 1c, code information is recorded as magnetization states of two directions on a medium surface. At the time of reproducing, a leak magnetic field from the magnetized medium is sensed by a reproducing head 2b, converted to electrical voltage information, and output as a reproduced signal 3a.

In the reproduced signal processing system 3, the reproduced signal 3a thus read out is amplified by a reproducing amplifier 7b, and subjected to waveform processing by an analog reproduced signal processing system 8a. The analog reproduced signal processing system 8a includes a gain control amplifier for performing automatic control on amplitude of an input reproduced signal, a filter/compensation circuit for performing constraint/compensation on a signal baseline or low frequency variation, and a low-pass filter for removing unnecessary high frequency noise and signal components or a compensation circuit for compensating the degraded high frequency components. Thereafter, a signal resulting from the analog reproduced signal processing system 8a is converted to a digital sampled discrete reproduced signal sequence $\{d_k\}$ 3b by an analog to digital (A/D) converter 8b at bit timing of the recording code data sequence $\{c_k\}$ 1c. (Typically, the sampling timing information is extracted from the reproduced signal 3a or a discrete reproduced and equalized signal sequence $\{e_k\}$ 3c of a back stage appropriately, and automatically controlled by using an existing technique such as the PLL (phase-locked loop) control.)

For most efficient and highly reliable data demodulation, in the present embodiment, an equalizer 9a performs partial response (PR) waveform equalization processing matched to the reproduced signal 3a supplied from the head and recording medium system 2 on the discrete reproduced signal sequence $\{d_k\}$. Thereafter, the discrete reproduced and equalized signal sequence $\{e_k\}$ 3c supplied from the equalizer 9a is input to a maximum likelihood decoder (ML decoder) 9b. A decoded data code sequence $\{f_k\}$ 3d corresponding to the recording code data sequence $\{c_k\}$ 1c is thus demodulated and reproduced. The equalizer 9a controls and compensates the frequency transfer characteristic in its final stage of the partial response transmission system 9 so as to provide a whole serial signal transmission system (the partial response transmission system 9) ranging from the recording current conversion processing circuit 6 to the equalizer 9a around the head and recording medium system 2 with a desired partial response transfer characteristic. The equalizer 9a typically includes a transversal linear filter. Furthermore, there is included means for carrying out learning control on the equalizer filter characteristic by employing an automatic equalization filtering technique using digital filter signal processing so as to be able to eliminate differences and variations of various physical characteristics existing in the actual transmission system and keep the transmission characteristics in the actual system stably at desired characteristics.

The partial response transfer characteristic is implemented by waveform shaping processing of adding a known waveform interference (intersymbol interference ISI) value with a finite bit length on the discrete reproduced and equalized signal sequence $\{e_k\}$ so as to be matched with the waveform intersymbol interference (ISI) and distortion caused on the reproduced signal 3a due to the frequency transfer characteristic of the head and recording medium system 2 as close as possible.

In the classical equalization technique, compensation of the frequency transfer characteristic is carried out for the purpose of suppressing and eliminating intersymbol interference that has occurred in the reproduced signal 3a. However, the equalizer 9a in the partial response transmission system 9 implements narrow band waveform processing closer to the waveform of the reproduced signal 3a, by frequency characteristic compensation that allows known intersymbol interference (ISI), and reduces the requirement for the equalized waveform processing. Thereby, the equalizer 9a in the partial response transmission system 9 suppresses excessive enhancement of noise caused by the high-frequency compensation of the reproduced wave for and improves the signal quality of the discrete reproduced and equalized signal sequence $\{e_k\}$ 3c.

On the other hand, the maximum likelihood decoder 9b performs data demodulation processing with higher data reliability on random noise by taking account of the known intersymbol interference added by the equalizer 9a and utilizing it as redundant information of the transmission code caused by memory elements the partial response transmission system 9 has. Maximum likelihood data detection (ML detection) using the Viterbi algorithm is typically applied to the maximum likelihood decoder 9b. For the input discrete reproduced and equalized signal sequence $\{e_k\}$ 3c, a candidate of the recording code data sequence $\{c_k\}$ 1c estimated to have the highest probability of being transmitted is selected and output as the decoded data code sequence $\{f_k\}$ 3d. The process of the partial response transmission system 9 and the maximum likelihood data detection in the recording and reproducing system of the present embodiment will be described in detail later with reference to FIG. 2. The data detection technique using the combination of the partial response transmission system 9 (PR data transmission system) and the maximum likelihood decoder (ML decoder) 9b as heretofore described is a known technique that is known as the PRML data detection technique and applied to a lot of existing recording and reproducing systems (especially magnetic disk apparatus recording and reproducing systems). Details of this technique is disclosed in, for example, "A PRML System for Digital Magnetic Recording," IEEE Journal on Selected Areas in Communications, vol. 10, pp. 38–56, January 1992.

The decoded data code sequence $\{f_k\}$ 3d output from the maximum likelihood decoder 9b is input to an error detection and correction unit 10, which is a feature of the present invention. While the error detection and correction unit 10 will be described in more detail with reference to FIGS. 3 and 4, it has a function of determining whether a code error event with a preset predetermined code error pattern occurs in the decoded data code sequence $\{f_k\}$ 3d by referring to the input discrete reproduced and equalized signal sequence $\{e_k\}$ 3c and the decoded data code sequence $\{f_k\}$ 3d. If the error event with a predetermined code error pattern is detected, then the code error event is corrected and a corrected data code sequence $\{b_k\}$ 3f is output. A demodulator 4b performs code conversion processing that is an inverse code conversion processing of the coder 4a, and finally demodulates and outputs a reproduced data code sequence $\{a_k\}$ 3g corresponding to the original information code data sequence $\{a_k\}$ 1a.

Figure 2:
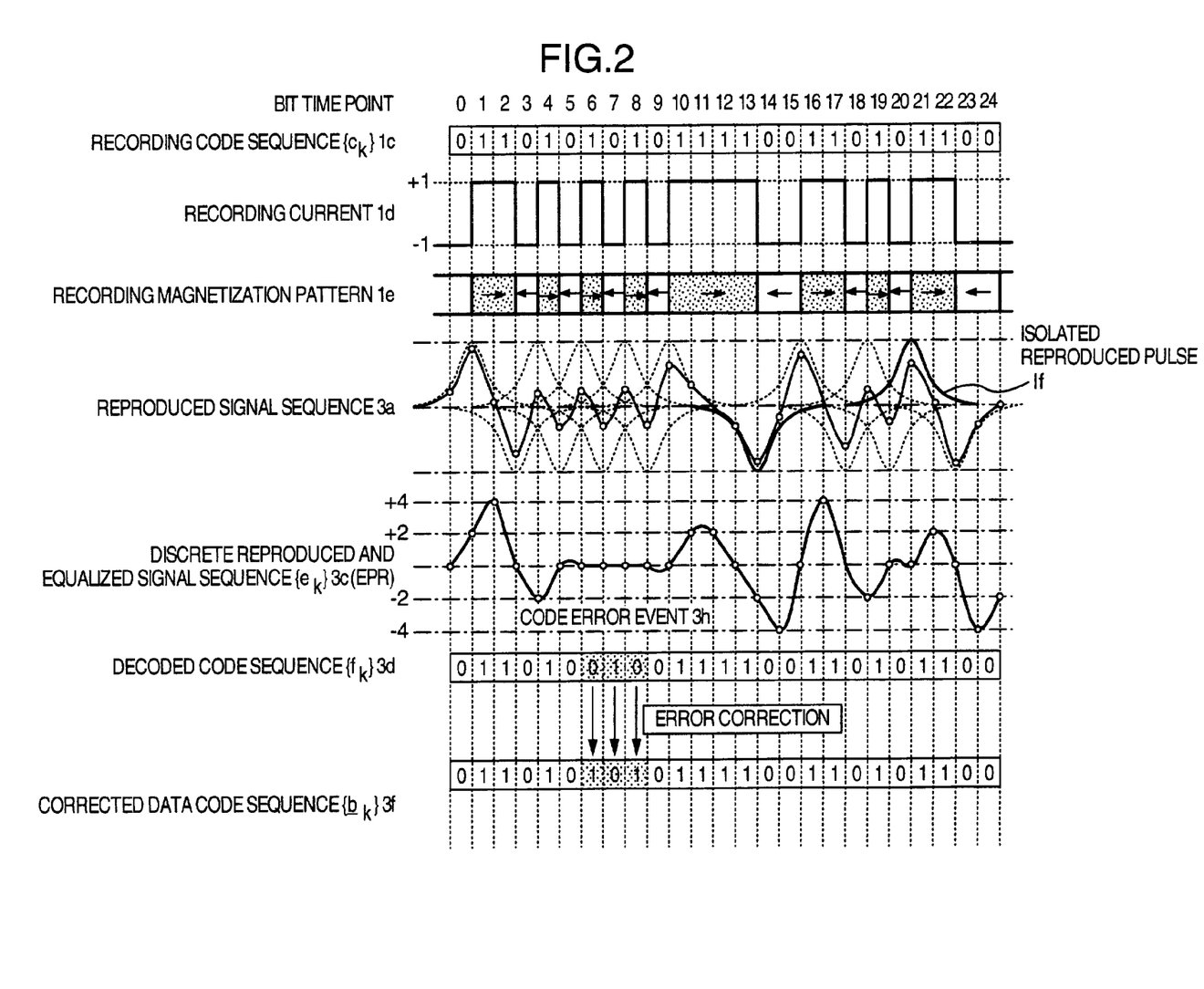
FIG. 2 is a signal waveform diagram showing a signal processing process in the recording and reproducing system according to the present invention.

In order to describe the signal processing process in the embodiment of FIG. 1 in detail, time charts of respective signals are shown in FIG. 2. The recording code data sequence $\{c_k\}$ 1c is converted to the recording current signal 1d, which assumes to have two direction polarities corresponding to binary code values $\{0, 1\}$. The resultant recording current signal 1d is supplied to the recording head 2a. As a result, recording magnetic fields of two directions corresponding to polarities of the recording current signal 1d are applied onto the recording medium 2c. A recorded magnetization pattern 1e which takes two magnetization directions corresponding to two sign values (binary code values) on the recording code data sequence $\{c_k\}$ 1c is thus formed. The information data representation of digital recording in which the recording sign values (binary code values) are associated with recording magnetization directions is widely known as NRZ recording. In a longitudinal magnetic recording technique in which the recording magnetization directions are taken in the in-plane direction in the recording medium as in the example of FIG. 1, an isolated reproduced pulse if is reproduced at magnetization inversion (transition) timing on the recorded magnetization pattern 1e when reproducing the recorded information by using a conventional ring reproducing head or a shield type magnetoresistance effect (MR) reproducing head of shield type. The isolated reproduced pulse if has a temporal width because of the frequency transfer characteristic of the recording and reproducing system 2 that depends upon the space between the head and the medium and the structure of the head and the media. The isolated reproduced pulses 1f are observed as a sequence (the reproduced signal sequence 3a) of pulses having a polarity that changes alternately so as to correspond to the direction of the magnetization inversion (transition). Therefore, waveform interference (intersymbol interference) is caused on a reproduced signal sequence 3a corresponding to a recording magnetization pattern 1e in high density recording (in narrow bit interval recording) due to the temporal spread pulse width of adjacent isolated reproduced pulses 1f, and consequently, signal amplitude of the reproduced signal sequence 3a is extremely reduced. In the high density recording and reproducing system, such reduction of the reproduced signal amplitude is a bottle neck in achieving a highly reliable data recording and reproducing. Therefore, the partial response transmission system in which the waveform equalization processing is performed so that the isolated reproduced pulse if is allowed to have a known intersymbol interference, is applied to the high density recording and reproducing system. When an output response waveform of the partial response transmission system in response to impulse input at each bit time position is a causal response having intersymbol interference ($a_0$, $a_1$, $a_2$, ... $a_k$, $a_{L-1}$) (where k is an integer that indicates output bit time position, and $a_k$ is a real or integer number value that indicates a signal amplitude value) over L consecutive bit time position, the partial response transmission system is characterized by the following transfer polynomial.

$$F(D)=a_0+a_1D+a_2D^2+ \ldots +a_kD^k+a_{L-1}D^{L-1} \quad (1)$$

(D denotes a one-bit delay operator)

$D^k$ represents a signal delay in the k bit instance. It is indicated that a signal $a_k$ appears at a time position delayed from the output bit time position corresponding to the impulse input by k bits.

In the magnetic recording and reproducing system of FIG. 1, the reproduced signal sequence 3a is subjected to a desired analog signal processing, and analog to digital (A/D) converter to output the digital sampled discrete reproduce signal sequence $\{d_k\}$, then subjected to equalization processing in the equalizer 9a, and thereby converted to a partial response signal sequence having intersymbol interference described by a predetermined transfer polynomial F(D). Then, the serial transmission system ranging from the recording and reproducing system to an output of the equalizer 9a can be replaced equivalently by a transmission system of discrete signal values having the impulse response of Equation (1). In this replaced transmission system, the recording current signal 1d at the input of the system, is replaced by a discrete impulse signal sequence that is assumed to take two bipolar polarities {−1, +1} in association with each binary code values {0, 1} of the NRZ code data sequence $\{c_k\}$ 1c. In the ensuing embodiments, therefore, each binary value of the NRZ code data sequence $\{c_k\}$ 1c represents a bipolar signal value {−1, +1} that has correspondence relations 1→+1 and 0→−1 with respect to the original recorded bit information {0, 1}. As a result, the discrete reproduced and equalized signal sequence $\{e_k\}$ output from the equalizer 9a is represented by the following Equation (2) by using linear convolutional operation of the impulse response ($a_0$, $a_1$, $a_2$, ... $a_k$, $a_{L-1}$) of the partial response transmission system and the NRZ code data sequence $\{c_k\}$ 1c.

$$e_k=a_0c_k+a_1c_{k-1}+a_2c_{k-2}+ \ldots +a_{L-1}c_{k-L+1} \quad (2)$$

The longitudinal magnetic recording and reproducing system has a differential system characteristic as described above. As a partial response transfer polynomial F(D) suitable for this system, therefore, the PR 4 (Partial Response Class-IV) transmission system that includes a digital differential factor (1−D) in the transfer polynomial is selected. Consequently, the transfer polynomial is generally represented by the following Equation (3).

$$F(D)=(1-D)(\underline{a_0}+\underline{a_1}D+\underline{a_2}D^2+ \ldots +\underline{a_k}D^k+ \ldots + \underline{a_{L-2}}D^{L-2}) \quad (3)$$

This type of the transfer polynomial shows that the system has a null frequency characteristic at DC signal component.

Especially in the high density magnetic recording and reproducing system such as a magnetic disk drive apparatus, an EPR4 (Extended Partial-Response class-IV) transmission system, an E²PR4 (Extended EPR4) or ME²PR4 (modified E²PR4) have been widely used. For the EPR4 transmission system, an added intersymbol interference quantity is expanded so as to satisfy the relations L=4, $\underline{a_0}$=1, $\underline{a_1}$=2, and $\underline{a_2}$=1 in Equation (3). The transfer polynomial is represented by the following Equation (4).

$$F(D)=(1-D)(1+2D+D^2)=(1-D)(1+D)^2=1+D-D^2-D^3 \quad (4)$$

Then, the spectrum of the output waveform of the equalized impulse response has a frequency characteristic (where the frequency is normalized by the recording bit frequency $1/T_b$) represented by the following Equation (5).

$$G(f)=\sin(2\pi f.T_b)\cos^2(2\pi f.T_b) \quad (5)$$

The addition of the intersymbol interference in Equation (3) reduces the required frequency components of the equalized waveform around the transmission frequency $½T_b$ according to the factor $\cos^2(2\pi f.T_b)$ in Equation (5). In other words, this characteristic provides the closer approximation to the frequency composition of the reproduced signal waveform supplied from the high density magnetic recording and reproducing system. (As shown in FIG. 2, the reproduced signal sequence and the equalized signal sequence thus have similar waveform shapes.) In the waveform processing performed in the equalizer 9a, the requirement of the high frequency compensation in the reproduced waveform is remarkably reduced. Consequently, the increase of the noise and distortion caused by the compensation is suppressed. Therefore, the signal quality at the output of the equalizer 9a is kept favorable by the data demodulation.

On the other hand, in the maximum likelihood decoder 9b, data detection using a computation technique such as the Viterbi algorithm is performed in order to decode the recording code data sequence from the equalized signal sequence having the already known additional intersymbol interference. The relation between the recording code data sequence {ck} 1c and the discrete reproduced and equalized signal sequence $\{e_k\}$ is prescribed by Equation (1). According to this equation, a given partial response transmission channel can be represented by a kind of a state transition model having channel memory elements of a length of L bits. In the maximum likelihood decoder 9b, reliability of data demodulation can be improved by utilizing the channel memory property that the partial response transmission channel has. The principle and means of the Viterbi algorithm for implementing the maximum likelihood decoder 9b are disclosed in detail in, for example, the aforementioned paper, Cideciyau et al "A PRML System for Digital Magnetic Recording," IEEE Journal on Selected Areas in Communications, vol. 10, pp. 38–56, January 1992.

In a decoded data code sequence $\{f_k\}$ supplied from such a PRML data detection system, the occurrence frequency of some specific code error events (error events) in which the code value changes in a specific pattern becomes higher. In short, the occurrence frequency of the error event depends on a signal distance (Euclid distance) between the decoded signal sequence corresponding to the correct data code sequence and the decoded signal sequence corresponding to the error data code sequence. As the signal distance under the assumption of an error event (Euclidian distance) becomes effectively smaller, the frequency occurrence of that error event can be predicted to be higher. According to this property, it is possible to previously specify and discriminate an error event pattern having a biased occurrence frequency an dominant error event that frequently appears in decoded code sequence $\{f_k\}$ 3d, on the basis of the characteristic of the PR data transmission system. The present invention has a feature in that the error detection and correction unit 10 is provided after the maximum likelihood decoder (ML decoder) 9b in order to detect the specified dominant error events that frequently occur in the maximum likelihood decoder (ML decoder) 9b with a higher precision and thereby improve the reliability of the decoded data code sequence $\{f_k\}$ 3d. The error detection and correction unit 10 detects a specific code error event 3h that occurs in the decoded data code sequence $\{f_k\}$ 3d, corrects it, and thereby outputs the corrected data code sequence $\{b_k\}$ 3f.

In the conventional technique, the maximum likelihood decoder (ML decoder) 9b selects a maximum likelihood data sequence having the highest reliability on the basis of the premise that a signal disturbance superposed on the discrete reproduced and equalized signal sequence $\{e_k\}$ 3c can be regarded as stationary white noise. However, there exist in the actual reproduced signal 3a disturbances given from the head and recording medium system 2 due to various physical causes, and consequently the premise does not hold true in the actual recording system. Therefore, the decoded data code sequence $\{f_k\}$ 3d output from the maximum likelihood decoder (ML decoder) 9b gets out of the maximum likelihood data sequence. In order to improve the drawback of the maximum likelihood decoder, therefore, the error detection and correction unit 10 in the present invention has a role of estimating the reliability of the decoded data code sequence $\{f_k\}$ 3d again and modifying the decoded data code sequence $\{f_k\}$ 3d so as to obtain a result of a data sequence that is closer to the maximum likelihood estimation.

Hereafter, operation of the error detection and correction unit 10 will be described in more detail. It is now supposed that a recording code data sequence $\{c_k\}$ 1c represented as $\{\ldots c_i, c_{i+1}, c_{i+2}, c_{i+3}, c_{i+4}, c_{i+5}, \ldots\}$ is recorded and reproduced via the partial response channel described by Equation (1) and as a result $\{\ldots y_i, y_{i+1}, y_{i+2}, y_{i+3}, y_{i+4}, y_{i+5}, \ldots\}$ is observed as the discrete reproduced and equalized signal sequence $\{e_k\}$ 3c. It is now supposed that at this time each reproduced signal value $y_k$ is observed as superposition of a noise signal value $n_k$ on a normal signal value $e_k = a_0 c_k + a_1 c_{k-1} + a_2 c_{k-2} + \ldots + a_{L-1} c_{k-L+1}$ described by Equation (1). Therefore, the relation of the following Equation (6) is satisfied.

$$y_k = e_k + n_k \quad (6)$$

A decoded data code sequence $\{f_k\}$ 3d supplied from the maximum likelihood decoder (ML decoder) 9b for the reproduced signal is described as $\{\ldots f_0, f_1, f_2, f_3, f_4, f_5, \ldots\}$ (code value $f_k = \pm 1$). In principle, the known maximum likelihood decoder (ML decoder) 9b evaluates an accumulated square error $L_{det}$ between the observed signal sequence $\{\ldots y_1, y_{i+1}, y_{i+2}, y_{i+3}, y_{i+4}, y_{i+5}, \ldots\}$ and a normal (noiseless) discrete reproduced and equalized signal sequence $\{e_k\}$ 3c as represented by the following Equation (7) as a criterion, and selects a recording code data sequence $\{c_k\}$ 1c that has the minimum of the accumulated square error as the decoded data code sequence $\{f_k\}$ 3d.

$$L_{det} = \Sigma(y_k - e_k)^2 (e_k = a_0 c_k + a_1 c_{k-1} + a_2 c_{k-2} + \ldots + a_{L-1} c_{L+1}) \quad (7)$$

This means that a decoded data code sequence $\{f_k\}$ that has the highest probability of being normal data is selected by estimating the whole observed signal sequence, supposing that the noise sequence $\{n_k\}$ super-posed on the reproduced signal value $y_k$ is stationary white noise. The maximum likelihood detection in which data code sequence decision is performed on the basis of evaluation of accumulated square errors between signal sequences has a feature that the occurrence probability of an error event having a specific code pattern (as described above) becomes high depending on whether the distance between correct and error signal sequences is large or small. In the present embodiment, a code error event previously supposed at a bit time position i is described by using a code error pattern E(i, m).

E (i, m) is described as E (i, m)=$(E_{i,0}, E_{i,1}, E_{i,2} \ldots E_{i,m})$ (m is a bit length of an error event). When $E_{i,k}$ is 0, it is indicated that a bit error has not occurred at the time position of a bit $c_{i+k}$. When $E_{i,k}$ is +2, occurrence of an error event from a correct bit $c_{i+k}=+1$ to $f_{i+k}=-1$ is indicated. When $E_{i,k}$ is −2, occurrence of an error event from a correct bit $c_{i+k}=-1$ to $f_{i+k}=+1$ is indicated. (In other words, the relation $E_{i+k}=c_{i+k}-f_{i+k}$ describes an error event between the decoded data code sequence $\{f_k\}$ 3d and the recording code data sequence $\{c_k\}$ 1c.) When such a code error event E(i, m) is supposed, an ideal discrete reproduced and equalized signal sequence $\{e_k\}$ for the normal (correct) recording code data sequence $\{c_k\}$ 1c in the case where there is no noise and the channel transfer characteristic is described by Equation (1), is represented as $e_k = a_0 c_k + a_1 c_{k-1} + a_2 c_{k-2} + \ldots + a_{L-1} c_{k-L+1}$ and an ideal discrete reproduced and equalized signal sequence $\{e'_k\}$ for the decoded data code sequence $\{f_k\}$ 3d with a supposed error event is represented as $e'_k = a_0 f_k + a_1 f_{k-1} + a_2 f_{k-2} + \ldots + a_{L-1} f_{k-L+1}$. Then, the occurrence probability (likelihood value) of the error event can be evaluated by using the L(i, m) defined by Equation (8) which is a difference between accumulated square errors $L_{det}$ for the two signal sequences $\{e_k\}$ and $\{e'_k\}$.

$$L(i,m) = \Sigma(y_k - e_k)^2 - \Sigma(y_k - e'_k) \quad (8)$$

According to the measure of the maximum likelihood detection represented by Equation (7), the decoded data code sequence $\{f_k\}$ 3d is selected by the criterion that it has an accumulated square error $L_{det}$ that is smaller than the accumulated square error $L_{det}$ for any other data code sequence. Therefore, L(i, m) always assumes to be a positive value. Affected by the noise superposed on $\{y_k\}$, however, the magnitude the L(i, m) changes. As the absolute value of the L(i, m) becomes smaller the occurrence possibility of the code error event described by the error code pattern E(i, m) becomes higher.

When a difference signal between the two ideal signal sequences $\{e_k\}$ and $\{e'_k\}$ is represented as $\{m_k = e_k - e'_k\}$, a signal difference caused by an error event E(i, m) (bit length m) starting from a bit position i appears in bit time interval between the bit positions i and i+(m+L−2) (length m+L−1) because of an influence of the channel length L that the partial response of Equation (1) has. (In the two ideal signal sequences, the difference signal in other bit portions is zero. A difference signal vector sequence $\{m_k\}$ having the length m+L+1 except the zero value bit portions is represented as $\{m_0, m_1, m_2, \ldots m(m+L-2)\}$. As the square distance $D=\Sigma m^{i2}$ of the difference signal becomes large, the probability that the L(i, m) approaching to 0 becomes small and consequently the occurrence probability of the code error event denoted by E(i, m) becomes low. For example, in the EPR channel (transfer polynomial $F(D)=1+D-D^2-D^3$) described earlier, there are, for example, E(i, 1)=±(+2) and E(i, 3)=±(+2, −2, +2) as representative error events. Then the difference signal vector sequences for the code error event E(i, 1) and E(i, 3) are ±(+2, +2, −2, −2) and ±(+2, 0, −2, +2, 0, −2), respectively. Both of them have a square distance D=16.

Figure 3A:
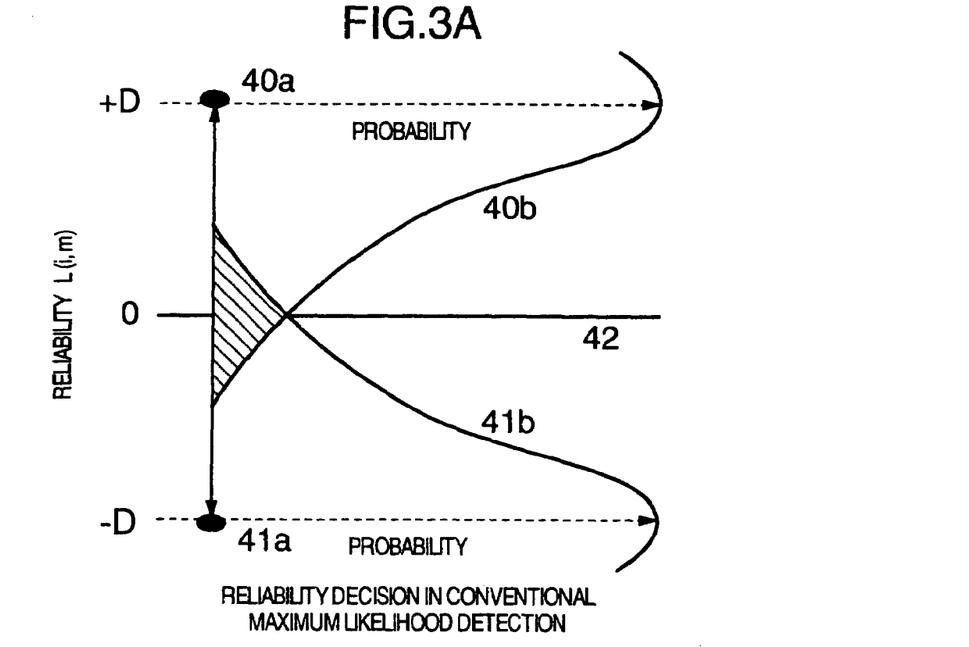
FIGS. 3A and 3B are waveform diagrams showing the principle of code error event detection in the present invention.
Figure 3B:
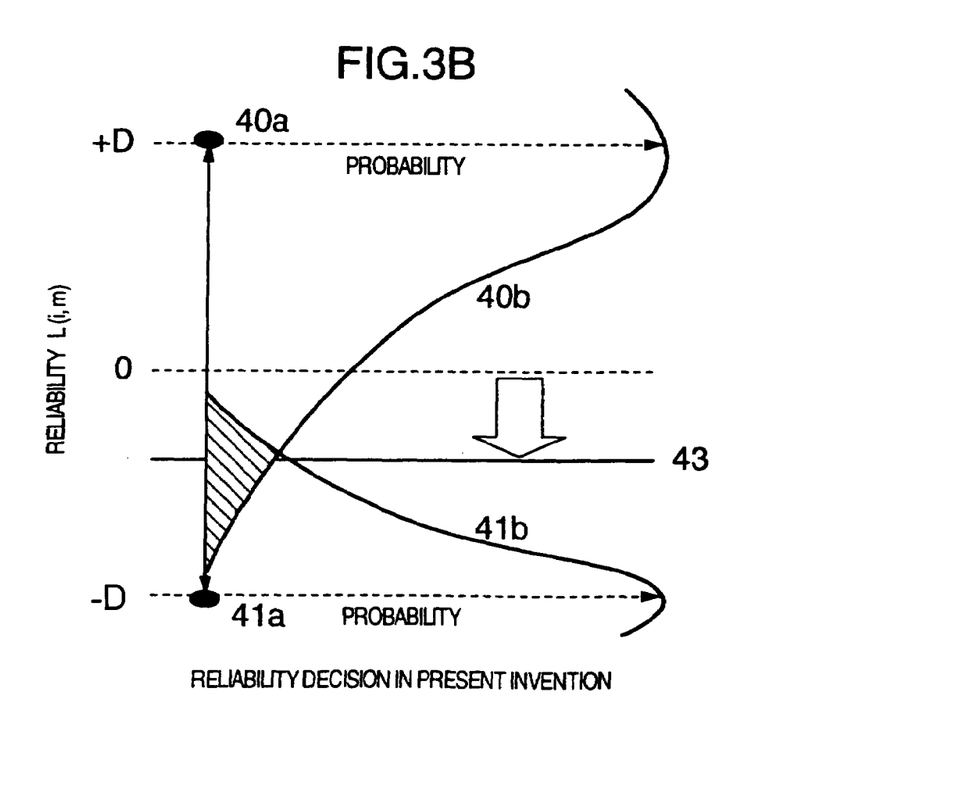

Supposing the specific code error event pattern E(i, m), relations of likelihood values L(i, m) in a maximum likelihood decision between a normal (correct) data code sequence $\{c_k\}$ and an error data code sequence $\{f_k\}$ are schematically shown in FIGS. 3A and 3B. If the normal (correct) data sequence is $\{c_k\}$ when effecting a decision as to which of the two sequences is more likely by using the criterion of Equation (8) as shown in FIG. 3A, the value of the likelihood value L(i, m) is assumed to have a probability distribution due to the noise on the reproduced signal sequence such as distribution 40b around a point 40a (a value of +D), which represents a likelihood value L(i, m) (reliability) in an ideal case free of noise. In order to effect a decision as to which of the sequences has a higher probability of being normal (correct) data on the basis of the value of the evaluated likelihood value L(i, m), it is suitable to use the center level (middle point) between the point 40a and the point 41a as a threshold 42 and select a data sequence represented by a point closer to the value of E(i, m) as the normal (correct) data sequence. In ordinary known maximum likelihood data detection, decoded data is selected according to this criterion. This is based upon supposition that noise superposed on the signal follows the same statistical distribution at any data position irrespective of the supposed data sequence. In other words, in the correct code data sequence $\{c_k\}$ and error data code sequence $\{f_k\}$, superposed noise is supposed to have similar distributions. Therefore, distributions 40a and 40b in FIG. 3A have the same distribution. Under this supposition, an optimum threshold 42 is always set at the center (middle point) between the point 40a and the point 41a. If at this time the actually recorded normal data is $\{c_k\}$, then an error event occurs when the likelihood value L(i, m) becomes the threshold 42 or less. If the correct data is $\{f_k\}$, then an error occurs when the likelihood value L(i, m) is a value of more than the threshold 42. Consequently, the detection error probability corresponds to an area of a shaded region shown in FIG. 3A. When the distribution 40b is similar to the distribution 41b, the threshold 42 is set to the center value 0 in order to minimize the detection error probability.

In actual information recording and reproducing systems, however, this supposition on noise statistics does not hold true in many cases. For example, in the magnetic recording and reproducing systems, the magnetization transition shape in the high density recording magnetization pattern recorded on the medium 2c has an irregular dispersion, and the position is fluctuated indefinitely. Therefore, so-called medium noise is generated and this occupies many of noise factors. Such medium noise behaves with data pattern dependency in which the statistical distribution of the noise changes depending on the number and distribution of recorded magnetization transitions in the recording magnetization pattern. When effecting a decision as to likelihood between two data sequences $\{c_k\}$ and $\{f_k\}$ as described above, therefore, in fact the noise distributions 40b and 41b of L(i, m) become different depending on magnetization patterns respectively of the supposed data sequences $\{c_k\}$ and $\{f_k\}$ as shown in FIG. 3B. This difference in the supposition on the noise statistical purpose causes a degradation of the detection error rate in the conventional maximum likelihood data detection shown in FIG. 3A. (If the threshold 43 is set to the center value 0 in FIG. 3B, the error rate on the data sequence $\{c_k\}$ (point 40a) increases.)

In order to correct the difference in the supposition on the noise statistics and compensate for the performance of the maximum likelihood data decoder 9b, the error detection and correction unit 10 in the embodiment of the present invention is provided with a function of compensating for the difference between the noise distributions 40b and 41b of L(i, m) caused by the difference of the supposed data sequences $\{c_k\}$ and $\{f_k\}$. For this purpose, the value of the threshold is made variable. Supposing the data sequences $\{c_k\}$ and $\{f_k\}$ at each bit position on the decoded code sequence, the threshold is changed to an optimum value as represented by the threshold 43. Thus the discrimination margin for the data sequence $\{c_k\}$ having the larger noise distribution can be increased to improve the reliability of the data discrimination.

For example, if it is supposed that the noise distributions 40b and 41b have similar distribution shapes, the ratio of the distance between 40a and the threshold 43 to the distance between 41a and the threshold 43 is set according to the ratio in distribution width (standard deviation) between 40b and 41b. The difference of width (standard deviation) in noise distribution can be previously evaluated from the dispersion of the magnetization transition shape and the average deviation of the transition position peculiar to the characteristic of the recording and reproducing system, and magnetization transition positions in the supposed data sequences $\{c_k\}$ and $\{f_k\}$. By using the decoded data code sequence $\{f_k\}$ 3d supplied from the maximum likelihood data decoder 9b, a code error event E(i, m) having a high occurrence frequency is supposed at each bit position i. While evaluating and modifying the difference and bias of the width (standard deviation) of the noise distribution by referring to the bit pattern of the decoded data code sequence $\{f_k\}$ before and behind the bit position i, L(i, M)=$\Sigma(y_k-e_k)^2-(y_k-e_k)^2$ represented by Equation (8) is evaluated at each bit position. For the evaluated L(i, m) the optimal threshold 43 is set up referring to the bit pattern of the decoded data code sequence $\{f_k\}$ before and after the bit position i, in order to detect the supposed code error E(i, m). As a result, estimation of occurrence probability of the error event E(i, m) is implemented with higher precision.

Such an error detection and correction unit 10 can be extremely simplified by limiting the code error event E(i, m) to only one that affects the reliability of data detection. If the code error event E(i, m) (m=k) is prescribed with respect to the partial response transmission system prescribed by Equation (1) and the above described difference signal vector sequence $\{m0, m1, m2, \ldots m(k+L-2)\}$ is identified, then the likelihood value L(i, m) of Equation (8) is estimated by using the matched filtering technique. The following equation represents an example of the likelihood value L(i, m) 24a (m=1).

$$L(i, m) = (m_0 y_i + m_1 y_{i+1} + m_2 y_{i+2} + m_3 y_{i+3} + m_{k+L-2} y_{i+k+L-2}) + \quad (9)$$
$$\Sigma(f_{i-j} + f_{i+j})(m_0 m_j + m_1 m_{j+1} + \cdots + m_{k+L-2-j} m_{k+L-2})$$
$$(j = 1, 2, \cdots, K + L - 2)$$

Figure 4:
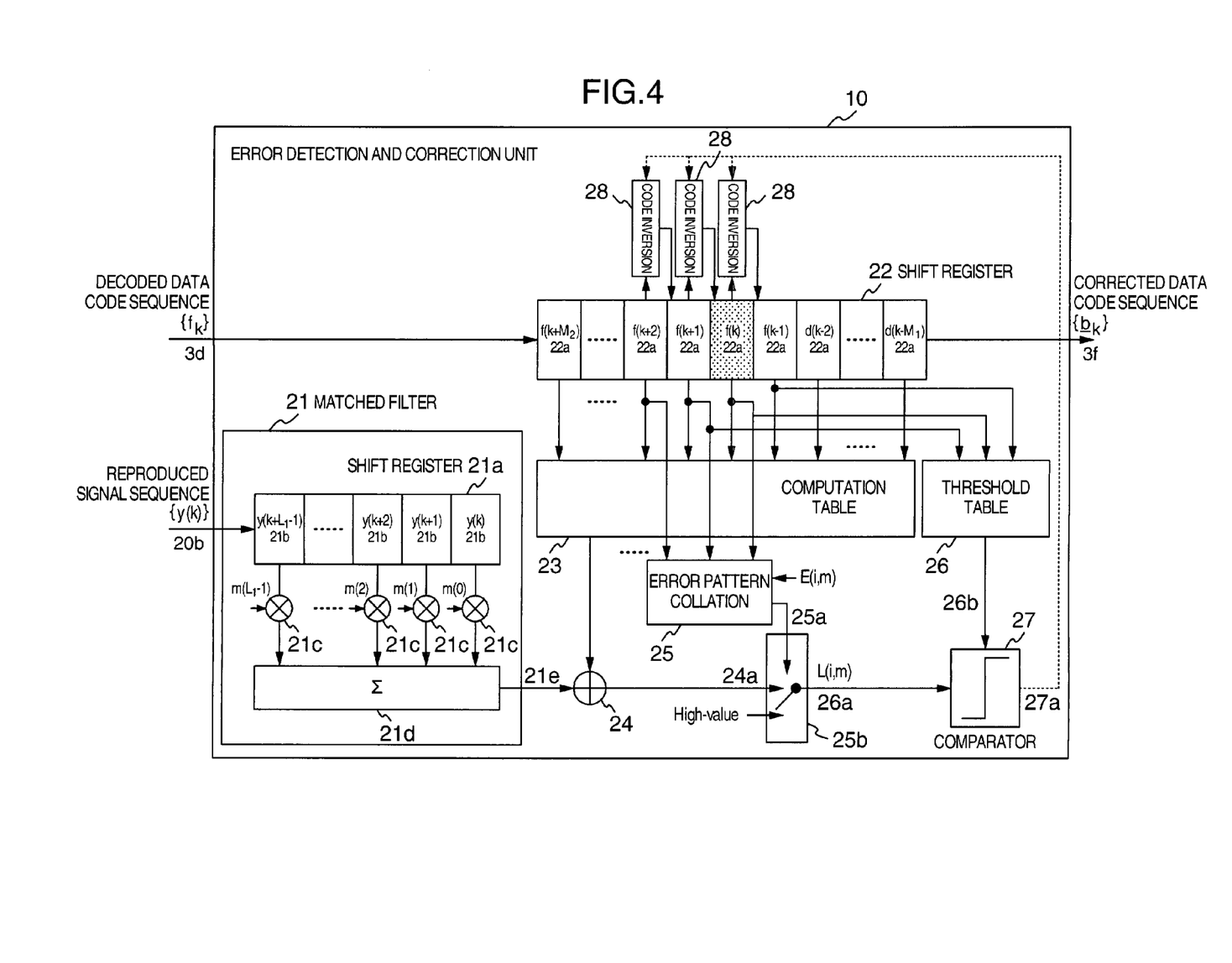
FIG. 4 is a circuit block diagram of an error detection corrector according to an embodiment of the present invention.

FIG. 4 is a diagram showing a basic configuration example of the error detection and correction unit 10 according to Equation (9). A matched filter 21 in its initial stage corresponds to computation of a first term of Equation (9). The matched filter 21 performs basic computation for evaluating the likelihood value L(i, m) for a code error event E(i, m) on the basis of the reproduced signal sequence $\{y_k\}$ input to the maximum likelihood decoder (ML decoder) 9b. A reproduced signal sequence $\{y_k\}$ 20b supplied from the equalizer 9a is stored momentarily in a shift register 21a having a length of $L_1$=K+L-1. Reference numeral 21b denotes the content of the shift register 21a. Product sum computation between the reproduced signal sequence $\{y_k\}$ 20b and the difference signal vector sequence $\{m_0, m_1, m_2, \ldots m_{(k+L-2)}\}$ is performed by using multipliers 21c and an adder 21d. As a result, a matched filter output 21e is calculated. An adder 24 in the next stage corresponds to computation of a second term of Equation (9). The decoded data code sequence $\{f_k\}$ 3d supplied from the maximum likelihood decoder 9b is stored in a shift register 22 (having a length of $M_1+M_2+1$). (Here, typically $M_1$ is set to K+L−2 and $M_2$ is set to 2K+L−2.) On the basis of the contents 22a of the shift register 22, a predetermined computation quantity corresponding to the second term is selected from a computation table 23. Since the second term of Equation (9) is a term prescribed only from the difference signal vector sequence $\{m_0, m_1, m_2, \ldots m_{(k+L-2)}\}$, it is possible to previously prepare predetermined computation quantities respectively for combinations of values of the decoded data code held in the shift register 22 and hold the predetermined computation quantities in the computation table 23. An error pattern collation circuit 25 performs inspection to determine whether the supposed code error pattern E(i, m) can occur at a predetermined position of the decoded data code sequence $\{f_k\}$. For example, when a code error pattern E(i, m)=(+2, −2) extending over a plurality of bits is inspected, E(i, m) cannot occur in the data pattern of (+1, +1) and (−1, −1). The error pattern collation circuit 25 effects inspection on such states by referring to predetermined code positions of the decoded data code sequence $\{f_k\}$ 3d stored in the shift register 22.

If it is detected that the prescribed code error event E(i, m) cannot occur in L(i, m) at that time, then a switchover unit 25b is switched to output a high value and indicate that the occurrence probability of the code error event E(i, m) is infinitesimal (switchover control 25a). The L(i, m) output from the switchover unit 25b is compared in a threshold decision unit (comparator) 27 with a variable threshold 26b. It is thus determined according to the principle shown in FIG. 3B whether the code error event E(i, m) occurs at the predetermined position of the decoded data code sequence $\{f_k\}$. In the present embodiment, the variable thresholds 26b used at this time are previously stored in a storage circuit of a threshold table 26. According to the characteristic of the recording and reproducing system to which the present invention is applied, suitable values of variable thresholds 26b are set previously. By referring to a code value in a prescribed bit positions of the decoded data code sequence $\{f_k\}$ stored in the shift register 22, one of the variable thresholds 26b is selected out of the threshold table 26 and used for threshold decision. If as a result occurrence of the error event E(i, m) is detected, then an error correction signal 27a is output. At this time, code values in the shift register corresponding to error code positions are inverted by code inversion circuits 28, corrected in code errors, and stored in the shift register 22 again. As heretofore described, if a predetermined error event E(i, m) is detected in the decoded data code sequence $\{f_k\}$ stored in the shift register 22, the code values are corrected immediately. The decoded data code sequence $\{f_k\}$ is moved successively and is finally output as the corrected data code sequence $\{b_k\}$ 3f.

Figure 5:
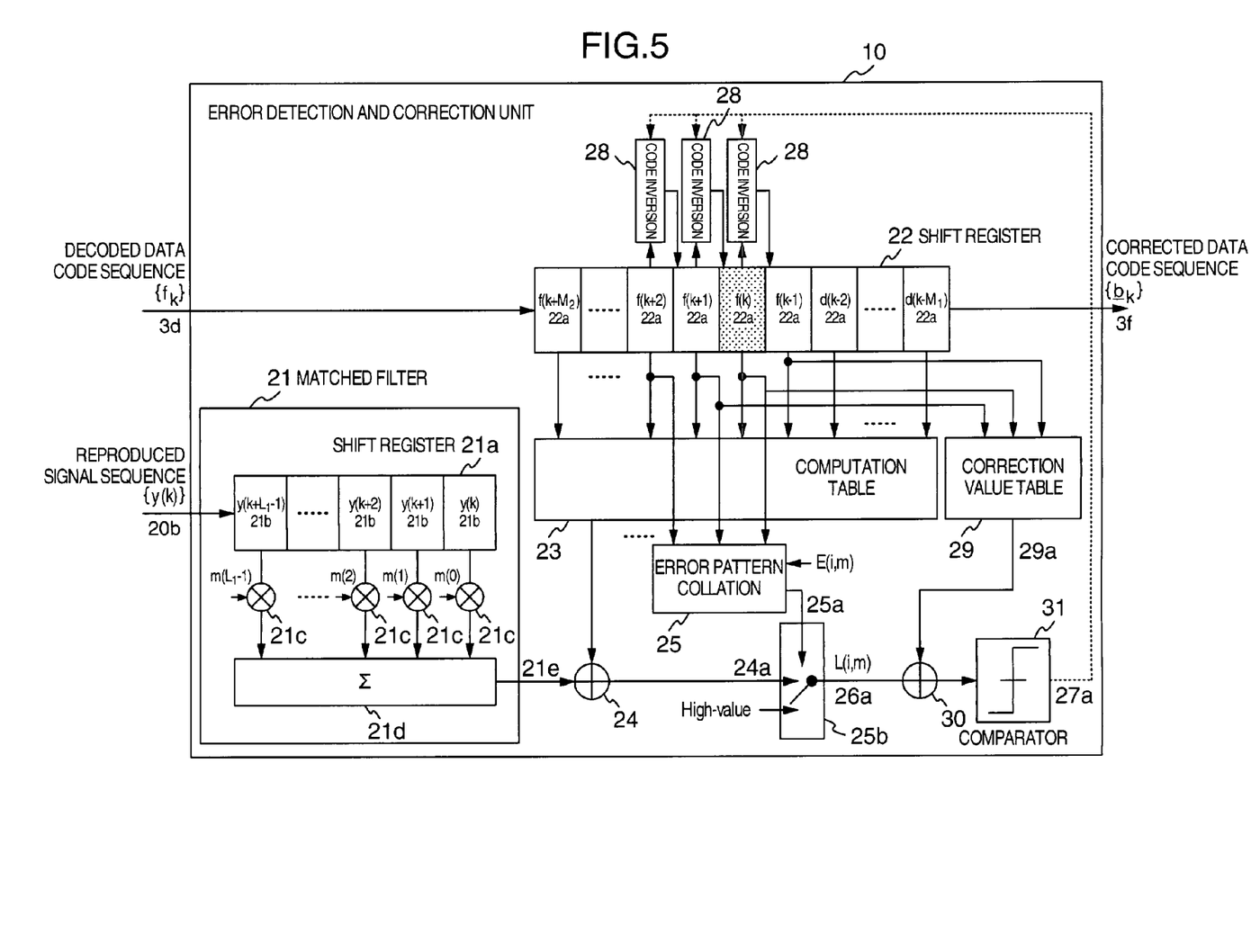
FIG. 5 is a circuit block diagram of an error detection corrector according to another embodiment of the present invention.

FIG. 5 shows a second embodiment of the error detection and correction unit 10. In the present embodiment, the decision of the likelihood value L(i, m) is performed by using a fixed threshold decision unit (comparator) 31, and a value of the likelihood value L(i, m) 26a itself input to the fixed threshold decision unit (comparator) 31 is compensated by an adder 30. A compensation quantity 29a for noise distribution that changes depending on the decoded data code sequence $\{f_k\}$ is previously stored as a content of a compensation quantity table 29. In the same way as the embodiment of FIG. 4, a code value in the prescribed position of the decoded data code sequence $\{f_k\}$ stored in the shift register 22 is referred to and one of the reliability compensation quantities 29a is selected out of the compensation quantity table 29 and used in the decision unit 31 accordingly. In such a configuration, the computation table 23 and the compensation quantity table 29, may be implemented collectively in a single circuit by using the same storage circuit (register circuit). The adder 24 and the adder 30 may also be integrated a single adder.

Figure 6:
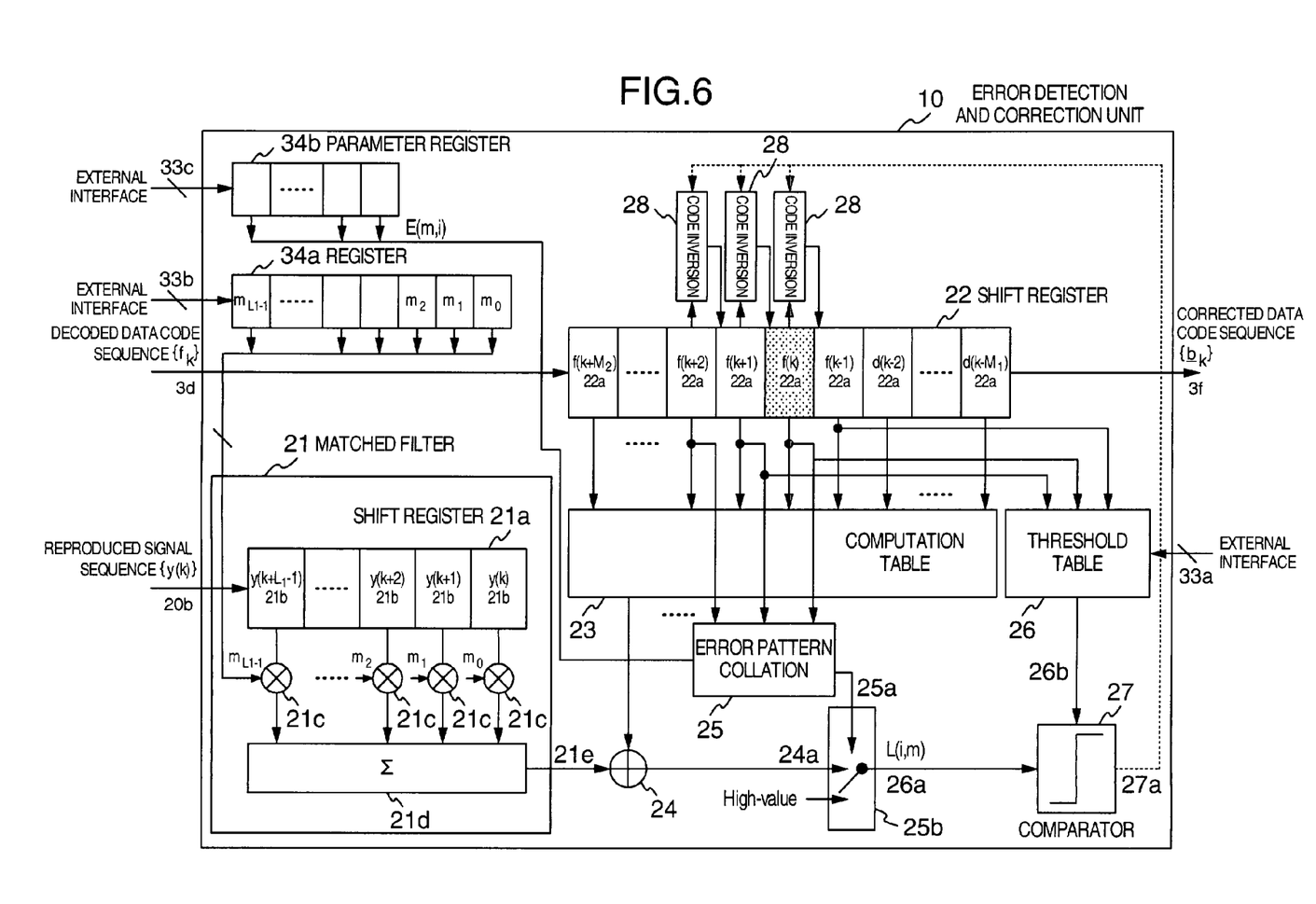
FIG. 6 is a circuit block diagram of an error detection corrector according to still another embodiment of the present invention.

In the actual information recording and reproducing system, it is expected that the reproduced signal and the noise characteristic (greatly) change, and an identified (specified) error event E(i, m) also changes depending on the recording and reproducing condition and the characteristic of the head and the recording medium 2. Therefore, it is desirable to use a configuration in which variable parameters are stored in the register and the contents of the register can be updated by an control signal given from the outside of the circuit as shown in an embodiment of FIG. 6. In the embodiment of FIG. 6, an external interface 33a for updating the contents of the threshold table 26 in the embodiment of FIG. 4 or the contents of the compensation quantity table 29 in the embodiment of FIG. 5 is set up. Furthermore, the pattern of the error event E(i, m) to be detected and corrected and the difference signal vector sequence $\{m_0, m_1, m_2, \ldots m_{(k+L-2)}\}$ corresponding to the E(i, m) are also stored in parameter setting registers 34a and 34b via external interfaces 33b and 33c, respectively. Such a configuration as to change the circuit parameters according to system condition is practical. Also, the error detection and correction unit 10 presented by this invention can be implemented independently after the maximum likelihood sequence decoder 9b. This feature is suitable for the high-speed circuit implementation.

The circuit system, the recording signal processing system 1 and the reproduced signal processing system 3 of the information recording and reproducing apparatus in each of the embodiments described heretofore can be easily implemented as high-speed, highly integrated, small-sized semiconductor device integrated circuits by using existing circuit technologies. By mounting the semiconductor integrated circuits on a recording and reproducing apparatus having the head and recording medium system 2, it becomes possible to improve the reliability of the data demodulation and realize the information recording and reproducing with a higher recording density.

By applying the present invention, data recording and reproducing with higher reliability can be realized in an information recording and reproducing system using the PRML technique. In particular, against medium noise that is generated depending on the recording data pattern, the reliability of the data demodulation of the conventional PRML technique can be improved remarkably. There is provided means for simply implementing an error correction signal processing technique having a function of intensively detecting and correcting only a few error events that affect the detection reliability.

Such an error correction signal processing technique or circuit can be implemented as a processing circuit that is completely independent of the components of the conventional PRML data demodulation system. Owing to the present invention, therefore, simple data demodulation means that is extremely matched to the conventional recording and reproducing data demodulation technique can be provided. In addition, by mounting a signal processing circuit implementing this on a high density information recording and reproducing apparatus, it becomes possible to improve the recording information density.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data decoding method for converting a first decoded code data sequence resulting from decoding of a signal sequence of non-code information by a maximum likelihood data sequence decoding method, comprising:
    a first step of providing a data decoding circuit for carrying out the data decoding method;
    a second step of inputting to said circuit the signal sequence and inputting to said circuit the first decoded code data sequence decoded from said signal sequence by using said maximum likelihood data sequence decoding method, and calculating, based on said signal sequence, likelihood values representing probabilities that error events having preset predetermined code error patterns occur at each code position on said first decoded code data sequence, the likelihood values being calculated for respective codes of the first decoded data sequence in a one-to-one relation;
    a third step of verifying contents of decoded code values on the first decoded data sequence corresponding to a position of a relevant decoded code, for which each likelihood value is calculated at said second step, and positions before and after the relevant decoded code over a predetermined code length, and adding a predetermined compensation value corresponding to the verified decoded code values to the likelihood value calculated at said second step;
    a fourth step of comparing each likelihood value compensated at said third step with a predetermined reference value; and
    a fifth step of inverting code values of a decoded code position of said first decoded code data sequence if the decoded code position corresponds to the preset predetermined code error pattern, based on a result of said fourth step, thereby generating a second decoded code data sequence, and outputting from said circuit the second decoded code data sequence as a resulting decoded code data sequence.

2. A data decoding circuit for converting a first decoded code data sequence produced from a signal sequence of non-code information by using a maximum likelihood data sequence decoder, said data decoding circuit comprising a decoded code data processing unit receiving the first decoded code data sequence from said maximum likelihood data sequence decoder, said decoded code data processing unit comprising:
    a computation circuit which receives as input the signal sequence and which also receives as input the first decoded code data sequence decoded from said signal sequence by using said maximum likelihood data sequence decoder, and wherein the computation circuit calculates, based on said signal sequence, likelihood values representing probabilities that error events having preset predetermined code error patterns occur at each code position on said first decoded code data sequence, the likelihood values being calculated for respective codes of the first decoded data sequence in a one-to-one relation;
    a compensation circuit that verifies contents of decoded code values on the first decoded data sequence corresponding to a position of a relevant decoded code, for which each likelihood value is calculated by said computation circuit, and positions before and after the relevant decoded code over a predetermined code length, said compensation circuit selecting a predetermined compensation value corresponding to the verified decoded code values, and adding the selected compensation value to the likelihood value calculated by said computation circuit, thereby performing compensation for the likelihood value;
    a comparison circuit which compares each likelihood value compensated by said compensation circuit with a predetermined reference value; and
    a code inversion circuit which inverts code values of a decoded code position of said first decoded code data sequence if the decoded code position corresponds to said preset predetermined code error pattern, based on a result output by said comparison circuit, thereby generating a second decoded code data sequence, and outputting the second decoded code data sequence as a resulting decoded code data sequence.

3. The data decoding circuit according to claim 2, wherein
    said computation circuit performs a product sum operation between respective values of vector parameters which represent a set of a finite number of signal parameter values and which correspond to the predetermined code error pattern and respective values of the input signal sequence,
    the vector parameters are stored in a predetermined memory circuit integrated in said data decoding circuit, and
    contents of the memory circuit are updated by using control signal inputs given from outside of said data decoding circuit.

4. The data decoding circuit according to claim 2, wherein all of said selected compensation values are previously stored in a predetermined memory circuit integrated in said data decoding circuit, and contents of the memory circuit are updatable by control signal inputs received from outside of said data decoding circuit.

5. The data decoding circuit according to claim 2, wherein said data decoding circuit is mounted on an integrated circuit or an integrated circuit device.

6. The data decoding circuit according to claim 5, wherein said integrated circuit or integrated circuit device is mounted on an information recording and reproducing apparatus.

7. A data decoding method for correcting errors in a first decoded code data sequence produced by decoding a signal sequence of non-code information using a maximum likelihood data sequence decoding method, comprising:
    providing a data decoding circuit for carrying out the data decoding method;
    inputting to said circuit the signal sequence and the first decoded code data sequence;
    calculating, based on said signal sequence, likelihood values representing probabilities that error events having preset predetermined code error patterns occur at each code position on said first decoded code data sequence, the likelihood values being calculated for respective codes of the first decoded data sequence in a one-to-one relation;
    verifying contents of decoded code values on the first decoded data sequence corresponding to a position of a relevant decoded code, for which each likelihood value is calculated, and positions before and after the relevant decoded code over a predetermined code length;

adding a predetermined compensation value corresponding to the verified decoded code values to the likelihood value calculated;

comparing each likelihood value compensated with a predetermined reference value to produce a result;

inverting code values of a decoded code position of said first decoded code data sequence if the decoded code position corresponds to the preset predetermined code error pattern, based on said result, thereby generating a second decoded code data sequence; and outputting from said circuit the second decoded code data sequence as a resulting decoded code data sequence.

* * * * *